(12) United States Patent
Mizuno et al.

(10) Patent No.: US 10,515,764 B2
(45) Date of Patent: Dec. 24, 2019

(54) MULTILAYER CERAMIC CAPACITOR HAVING A TUNED EFFECTIVE VOLUME

(71) Applicant: TAIYO YUDEN CO., LTD., Chuo-ku, Tokyo (JP)

(72) Inventors: Kotaro Mizuno, Takasaki (JP); Yukihiro Konishi, Takasaki (JP); Shohei Kitamura, Takasaki (JP); Yoichi Kato, Takasaki (JP); Yusuke Kowase, Takasaki (JP); Toru Makino, Takasaki (JP); Yoshinori Tanaka, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 16/184,740

(22) Filed: Nov. 8, 2018

(65) Prior Publication Data
US 2019/0080848 A1    Mar. 14, 2019

Related U.S. Application Data

(62) Division of application No. 15/072,166, filed on Mar. 16, 2016, now abandoned.

(30) Foreign Application Priority Data

Mar. 24, 2015  (JP) ................. 2015-060858

(51) Int. Cl.
*H01G 4/232*    (2006.01)
*H01G 4/30*     (2006.01)
(Continued)

(52) U.S. Cl.
CPC ............. *H01G 4/30* (2013.01); *H01G 4/0085* (2013.01); *H01G 4/1227* (2013.01); *H01G 4/232* (2013.01)

(58) Field of Classification Search
CPC ............. H01G 4/232; H01G 4/12; H01G 4/30
See application file for complete search history.

(56) References Cited

U.S. PATENT DOCUMENTS

| 5,251,094 A | 10/1993 | Amano et al. |
| 6,380,619 B2 | 4/2002 | Ahiko et al. |
| (Continued) | | |

FOREIGN PATENT DOCUMENTS

| CN | 102347131 A | 2/2012 |
| CN | 103065792 A | 4/2013 |
| (Continued) | | |

OTHER PUBLICATIONS

A First Office Action issued by the State Intellectual Property Office of China dated Sep. 25, 2017 for Chinese counterpart application No. 201610173145.0.

(Continued)

*Primary Examiner* — David M Sinclair
(74) *Attorney, Agent, or Firm* — Law Office of Katsuhiro Arai (57) ABSTRACT

A multilayer ceramic capacitor includes an element body of roughly rectangular solid shape which is constituted by dielectric layers alternately stacked with internal electrode layers having different polarities and which has a pair of principle faces, a pair of end faces, and a pair of side faces, wherein the multilayer ceramic capacitor is such that: external electrodes are formed on the pair of end faces and one principle face of the element body; and on a cross section taken in parallel with one end face of the multilayer ceramic capacitor near the end face, the ratio of area A constituted by the internal electrode layers connected to the external electrode on this end face side and the dielectric layers present (Continued)

between the internal electrode layers, and area B covering the part of the section excluding the external electrodes, A/B, is 0.92 or more.

3 Claims, 5 Drawing Sheets

(51) Int. Cl.
*H01G 4/008* (2006.01)
*H01G 4/12* (2006.01)

(56) References Cited

U.S. PATENT DOCUMENTS

| | | | |
|---|---|---|---|
| 8,259,433 B2 | 9/2012 | Nishisaka et al. | |
| 8,564,931 B2 | 10/2013 | Nishisaka et al. | |
| 8,824,119 B2 | 9/2014 | Kim et al. | |
| 9,082,556 B2 | 7/2015 | Fukunaga et al. | |
| 9,129,746 B2 | 9/2015 | Lee et al. | |
| 2001/0019176 A1 | 9/2001 | Ahiko et al. | |
| 2006/0126264 A1 | 6/2006 | Yoshii et al. | |
| 2008/0080120 A1 | 4/2008 | Togashi | |
| 2008/0225462 A1 | 9/2008 | Motoki et al. | |
| 2010/0123994 A1 | 5/2010 | Nishisaka et al. | |
| 2011/0290542 A1 | 12/2011 | Nishisaka et al. | |
| 2012/0048452 A1 | 3/2012 | Suh et al. | |
| 2012/0099241 A1 | 4/2012 | Chang et al. | |
| 2012/0250217 A1 | 10/2012 | Fukunaga et al. | |
| 2012/0300361 A1 | 11/2012 | Togashi | |
| 2012/0307418 A1 | 12/2012 | Kim et al. | |
| 2012/0327556 A1 | 12/2012 | Ahn et al. | |
| 2013/0020913 A1 | 1/2013 | Shirakawa et al. | |
| 2013/0094118 A1 | 4/2013 | Kim et al. | |
| 2013/0201601 A1 | 8/2013 | Nishisaka et al. | |
| 2013/0222972 A1* | 8/2013 | Saito | H01G 4/30 361/301.4 |
| 2014/0233148 A1 | 8/2014 | Jeon et al. | |
| 2014/0233149 A1 | 8/2014 | Jeon et al. | |
| 2014/0285947 A1 | 9/2014 | Suga et al. | |
| 2014/0292141 A1 | 10/2014 | Nishisaka et al. | |
| 2014/0301012 A1 | 10/2014 | Kim | |
| 2014/0355176 A1 | 12/2014 | Lee et al. | |
| 2015/0022945 A1 | 1/2015 | Park et al. | |
| 2015/0060122 A1 | 3/2015 | Lee et al. | |
| 2015/0200054 A1 | 7/2015 | Lee et al. | |
| 2015/0325377 A1 | 11/2015 | Takeuchi et al. | |
| 2016/0284473 A1* | 9/2016 | Murosawa | H01G 4/30 |
| 2016/0293331 A1 | 10/2016 | Kitamura et al. | |
| 2016/0293332 A1 | 10/2016 | Kato et al. | |

FOREIGN PATENT DOCUMENTS

| | | |
|---|---|---|
| CN | 104078235 A | 10/2014 |
| JP | H09260197 A | 10/1997 |
| JP | 1131633 A | 2/1999 |
| JP | H11186092 A | 7/1999 |
| JP | H11340083 A | 12/1999 |
| JP | 2005259772 A | 9/2005 |
| JP | 2006332334 A | 12/2006 |
| JP | 2007103496 A | 4/2007 |
| JP | 2012004480 A | 1/2012 |
| JP | 2012195555 A | 10/2012 |
| JP | 2012253245 A | 12/2012 |
| JP | 2013187537 A | 9/2013 |
| JP | 2014236215 A | 12/2014 |
| KR | 20120043501 A | 5/2012 |
| KR | 20120085193 A | 7/2012 |
| KR | 20140117295 A | 10/2014 |
| KR | 1020140121725 A | 10/2014 |

OTHER PUBLICATIONS

A Notification of Reason for Refusal issued by Korean Intellectual Property Office, dated Apr. 14, 2017, for Korean counterpart application No. 1020160034065.

A Second Office Action issued by the State Intellectual Property Office of China dated Mar. 22, 2018 for Chinese counterpart application No. 201610173145.0.

Non-Final Office Action issued by U.S. Patent and Trademark Office, dated May 31, 2018, for U.S. related application U.S. Appl. No. 15/072,166.

\* cited by examiner

MULTILAYER CERAMIC CAPACITOR HAVING A TUNED EFFECTIVE VOLUME

CROSS-REFERENCE TO RELATED APPLICATIONS

This application is a divisional of U.S. patent application Ser. No. 15/072,166, filed Mar. 16, 2016, which claims priority to Japanese Patent Application No. 2015-060858, filed Mar. 24, 2015, each disclosure of which is incorporated herein by reference in its entirety. The applicant herein explicitly rescinds and retracts any prior disclaimers or disavowals made in any parent, child or related prosecution history with regard to any subject matter supported by the present application.

BACKGROUND

Field of the Invention

The present invention relates to a multilayer ceramic capacitor having large effective volume and strong adhesion between its element body and external electrodes.

Description of the Related Art

In recent years, the high demand for smaller electronic components to support higher-density electronic circuits used in mobile phones, tablet terminals, and other digital electronic devices is accelerating the development of smaller, larger-capacitance multilayer ceramic capacitors (MLCC) which constitute these circuits.

The capacitance of a multilayer ceramic capacitor is directly proportional to the dielectric constant of the material constituting the dielectric layers that in turn constitute the capacitor, the number of dielectric layers, and the effective internal electrode layer area or specifically the area of the overlapping parts of the internal electrode layers led out to the external electrodes alternately, and is inversely proportional to the thickness of one dielectric layer. Accordingly, meeting the demand for smaller multilayer ceramic capacitors requires increasing the dielectric constant of the material, reducing the thickness of the dielectric layer, and increasing the number of dielectric layers.

Furthermore, while a multilayer ceramic capacitor has external electrodes on both of its end faces for connecting to a board, etc., these external electrodes generally wrap around the other four faces in addition to the two end faces (so-called five-face electrodes) to allow for a board, etc., to be connected to any of the faces.

For this reason, the external dimensions of a multilayer ceramic capacitor represent the dimensions of its element body which is a laminate constituted by dielectric layers and internal electrode layers, plus the dimensions of its external electrodes. The larger (thicker) the external electrodes, the smaller the ratio of the element body (effective volume) that determines the capacitance of the multilayer ceramic capacitor becomes, resulting in insufficient capacitance.

Accordingly, methods have been studied and developed for forming an external electrode thin in order to ensure this effective volume is sufficient, and Patent Literature 1 also proposes forming an external electrode on the two end faces as well as on one pair of opposing faces (two faces) among the four faces contacting the end face (U-shaped three-face electrode). Since external electrodes are not formed on the remaining two faces where external electrodes are normally formed, the element body (laminate constituted by the internal electrode layers and dielectric layers) becomes correspondingly larger and the effective volume increases as a result.

Also, FIG. 13 in Patent Literature 1 suggests forming an external electrode only on one of the pair of opposing faces, other than the end faces, on which it is proposed to be formed (L-shaped two-face electrode).

Figure 6:
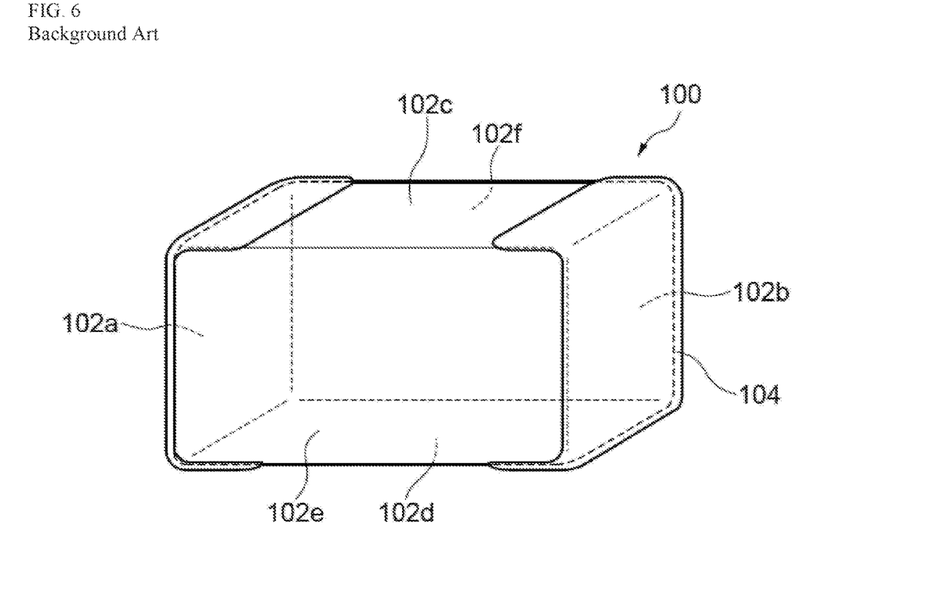
FIG. 6 shows a rough perspective view of a multilayer ceramic capacitor having the U-shaped three-face electrodes proposed by Patent Literature 1.

FIG. 6 is a rough perspective view of a multilayer ceramic capacitor 100 having the U-shaped three-face electrodes proposed in Patent Literature 1, and generally the faces on which the internal electrode layers are led out to the left and right external electrodes 104 are called "end faces" 102a, b; the top and bottom faces in the direction of lamination of the internal electrode layers and dielectric layers are called "principle faces" 102c, d; and the remaining pair of faces are called "side faces" 102e, f.

BACKGROUND ART LITERATURES

[Patent Literature 1] Japanese Patent Laid-open No. 2012-4480

SUMMARY

As proposed in Patent Literature 1, reducing the faces on which external electrodes are formed leads to a drop in the adhesion between the element body and external electrodes and may cause them to separate in a severe environment, which in turn can lower the reliability of the multilayer ceramic capacitor.

Accordingly, an object of the present invention is to provide a large-capacitance multilayer ceramic capacitor having large effective volume and strong adhesion between its element body and external electrodes.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the inventors of the present invention studied in earnest and adopted, for the purpose of increasing the effective volume, the L-shaped two-face electrode configuration proposed in Patent Literature 1 whereby external electrodes are formed on both end faces as well as one of a pair of faces contacting the end faces. However, since this configuration does not ensure enough adhesion between the element body and external electrodes and may lead to lower reliability, means for ensuring adhesion were studied.

In general, the multilayer ceramic capacitor has its top and bottom principle faces in the direction of lamination of the internal electrode layers and dielectric layers covered with cover layers, and has side margins formed on its side faces. Oftentimes the cover layers and side margins are formed using the same material as that of the dielectric layers.

For this reason, in a section cut in parallel with the end faces of the multilayer ceramic capacitor, the internal electrode layers are surrounded by the dielectrics. The inventors of the present invention found that, by expressing as a specified parameter the ratio of the internal electrode layers led out to the external electrodes and that of the dielectrics contacting the external electrodes and then controlling this parameter within a specific range, a large-capacitance multilayer ceramic capacitor could be provided while ensuring adhesion between the external electrodes and element body, and completed the present invention as a result.

In other words, the present invention is a multilayer ceramic capacitor having an element body of roughly rectangular solid shape which is constituted by dielectric layers alternately stacked with internal electrode layers having different polarities and which has a pair of principle faces, a pair of end faces and a pair of side faces, wherein the multilayer ceramic capacitor is such that: external electrodes are formed on the pair of end faces and one principle face of the element body; and on a section cut in parallel with one end face of the multilayer ceramic capacitor near the end face, the ratio of area A constituted by the internal electrode layers connected to the external electrode on this end face side and the dielectric layers present between the internal electrode layers, and area B covering the part of the section excluding the external electrodes, or A/B, is 0.75 or more.

Preferably the ratio A/B is 0.92 or less from the viewpoint of ensuring reliability in a high-temperature load test.

Preferably the thickness of the internal electrode layer is greater than the thickness of the dielectric layer from the viewpoint of improving the adhesion between the external electrode and element body.

Preferably the thickness of the external electrode formed on the one principle face is 1 to 30 μm, partly from the point of capacitance of the multilayer ceramic capacitor because a thinner external electrode means an increase in the number of internal electrode layers in the element body, and partly from the point of adhesion between the external electrode and element body because an increase in the number of layers translates to a larger area of the internal electrode layers contacting the external electrode.

In addition, preferably the thickness of the dielectric layer is 0.2 to 0.8 μm from the point of capacitance of the multilayer ceramic capacitor because the number of dielectric layers and internal electrode layers in the element body can be increased.

Preferably the ratio A/B is 0.78 or more from the viewpoint of improving the adhesion between the external electrode and element body.

According to the present invention, a large-capacitance multilayer ceramic capacitor is provided, which has large effective volume and strong adhesion between its element body and external electrodes.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

10 Multilayer ceramic capacitor
12a, b End face
12c, d Principle face
12e, f Side face
14 External electrode
16 Element body
17 Dielectric layer
18 Internal electrode layer
20 Laminate
22 Cover layer
24 Side margin
30 Position corresponding to the end of the internal electrode layer
32 Center internal electrode layer
34 Perpendicular bisector of the center internal electrode layer
36 Normal line of principle face d
100 Multilayer ceramic capacitor
102a, b End face
102c, d Principle face
102e, f Side face
104 External electrode
200 Internal electrode pattern
202 Bar-like laminate
204 Side margin
206 Laminate chip
300 Laminate chip
302 Group stage
304a to d Block material
306 Squeegee

DETAILED DESCRIPTION OF EMBODIMENTS

Figure 1:
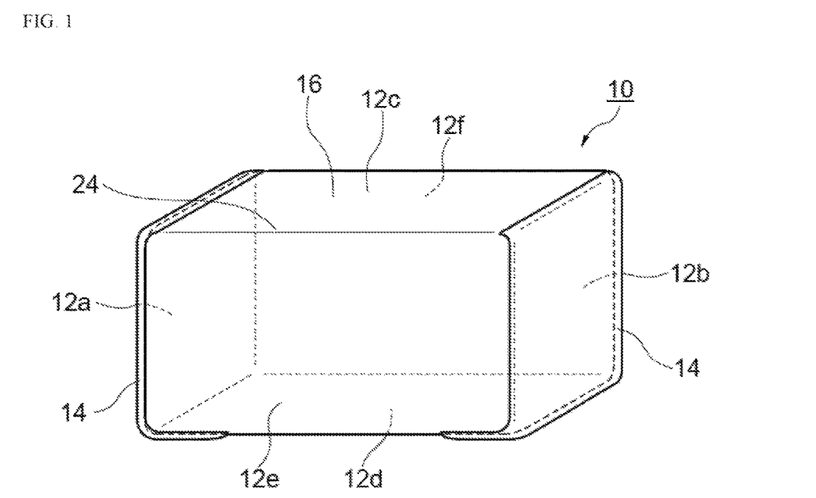
FIG. 1 shows a rough perspective view of a multilayer ceramic capacitor conforming to the present invention.

The multilayer ceramic capacitor in an embodiment of the present invention is explained below. FIG. 1 is a rough perspective view of a multilayer ceramic capacitor 10 conforming to the present invention. Also under the present invention, the faces on which the internal electrode layers are led out to the left and right external electrodes 14 are called "end faces" 12a, b; the top and bottom faces in the direction of lamination of the internal electrode layers and dielectric layers are called "principle faces" 12c, d; and the remaining pair of faces are called "side faces" 12e, f, as under the prior art.

Multilayer Ceramic Capacitor

Figure 2:
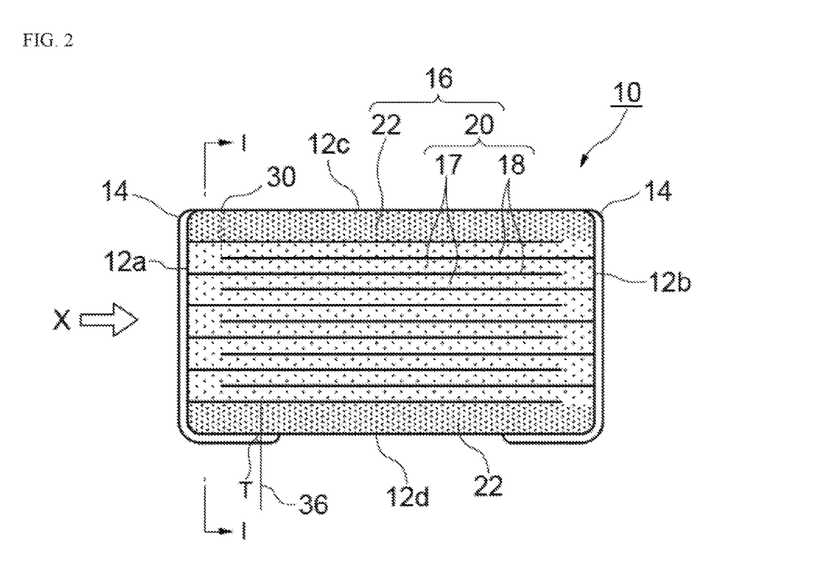
FIG. 2 shows a schematic view of a section of the multilayer ceramic capacitor 10 conforming to the present invention, cut in parallel with its side faces 12e, f.

FIG. 2 shows a schematic view of a section of the multilayer ceramic capacitor 10 conforming to the present invention, cut in parallel with its side faces 12e, f. The multilayer ceramic capacitor 10 is generally constituted by an element body 16 having standardized chip dimensions and shape (such as rectangular solid of 1.0×0.5×0.5 mm), as well as a pair of external electrodes 14 primarily formed on both end face sides of the element body 16. The element body 16 has a laminate 20 made of grain crystal such as $BaTiO_3$, $CaTiO_3$, $SrTiO_3$, and $CaZrO_3$ as its primary constituent, and internally constituted by dielectric layers 17 stacked alternately with internal electrode layers 18, while also having cover layers 22 formed at the top and bottom in the direction of lamination as outermost layers. Although not illustrated, side margins 24 forming a pair of side faces 12e, f are present in such a way that they cover the laminate 20 (internal electrode layers 18 thereof) and thereby prevent it from being exposed to the outside (refer to FIG. 1).

The laminate 20 is such that the thickness of the internal electrode layer 18 and that of the dielectric layer 17 sandwiched by two internal electrode layers 18 are set within specified ranges according to the static capacitance, required withstand voltage, and other specifications, and has a high-density multi-layer structure consisting of a total of around several hundred to a thousand layers.

The cover layers 22 and side margins 24 formed around the laminate 20 protect the dielectric layers 17 and internal electrode layers 18 against moisture, contaminants, and other polluting substances from the outside and prevent them from deteriorating over time.

Also, the internal electrode layers 18 are alternately led out to and electrically connected at their edges with a pair of external electrodes 14 that are present on both ends of the dielectric layers 17 in the length direction and that each have a different polarity.

With the multilayer ceramic capacitor 10 conforming to the present invention, a configuration is adopted whereby the external electrodes 14 are formed on the pair of end faces 12a, b and one principle face 12d of the element body 16 (so-called L-shaped two-face electrodes that are not formed on the other principle face 12c or pair of side faces 12e, f; refer to FIG. 1). This increases the ratio of the element body 16 to the multilayer ceramic capacitor 10 (effective volume) and thereby achieves large capacitance.

In the case of "not formed on the other principle face 12c," it includes cases where the external electrodes 14 are not at all present on the principle face 12c, as well as cases where, for example, an external electrode 14 is formed on the principle face 12c from the point of intersection between the principle face 12c and end face 12a (although FIG. 2 does not show a clear end point of the principle face 12c and end face 12a, here the principle face 12c (or principle face 12d) is considered to start from where the straight part of the end face 12a ends) to a position 30 corresponding to the end, on the end face 12a side, of the internal electrode layer 18 led out to the end face 12b side. The same applies to the end face 12b on the opposite side. On the principle face on which the external electrodes 14 are formed, the external electrodes 14 do not cover the entire principle face, but they are formed on the end face 12a side and end face 12b side with a certain distance in between.

In addition, in the case of "not formed on the pair of side faces 12e, f," it includes cases where the external electrodes are not at all present on these side faces, as well as cases where, for example, an external electrode 14 is formed on the side margin 24 from the point of intersection between the side face 12e and end face 12a to the position corresponding to the end, on the end face 12a side, of the internal electrode layer 18 led out to the end face 12b side, as is the case with the principle face. The same applies to the end face 12b and side face 12f on the opposite side.

In the above L-shaped two-face electrode configuration whereby the external electrodes 14 are formed on the pair of end faces 12a, b and one principle face 12d of the element body 16, the contact area between the external electrode 14 and element body 16 is smaller than on a multilayer ceramic capacitor of any conventional configuration. Accordingly, the adhesion between them drops and cracks generate easily, for example, due to thermal or physical shock, etc., and the reliability of the multilayer ceramic capacitor can drop as a result.

In response to the above, the multilayer ceramic capacitor 10 conforming to the present invention is such that, on a section cut in parallel with one end face 12a of the capacitor near the end face 12a, the ratio of area A constituted by the internal electrode layers 18 connected to the external electrode 14 on the end face 12a side and the dielectric layers 17 present between the internal electrode layers 18, and area B covering the part of the section excluding the external electrodes 14, or A/B, is 0.75 or more.

Figure 3:
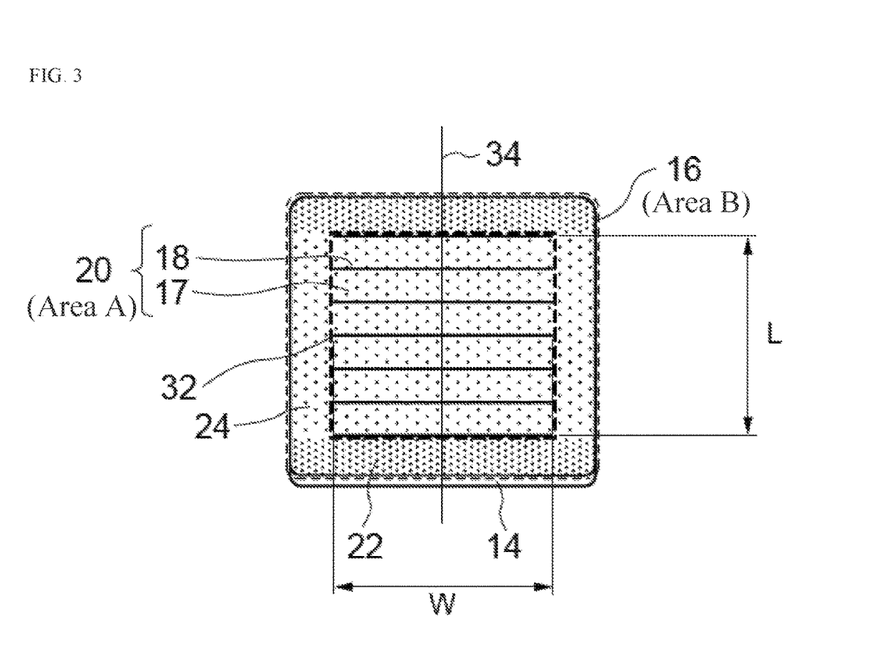
FIG. 3 shows a schematic view, from the direction of X in FIG. 2, of the section denoted by I-I in FIG. 2 which is cut near one end face 12a in parallel with the end face.

To explain this in greater detail, FIG. 3 is referenced. FIG. 3 is a schematic view, from the direction of X in FIG. 2, of the section denoted by I-I in FIG. 2 which is cut near one end face 12a in parallel with the end face.

This section is defined in such a way that, while the internal electrode layers 18 led out to the external electrode 14 formed on the one end face 12a are visible, the internal electrode layers 18 led out to the external electrode 14 formed on the end face 12b on the opposite side are not visible. As one standard, preferably a section is adopted which passes through the midpoint between the left end (not reaching the external electrode 14) of the second internal electrode layer from the top and the external electrode 14 on the side wall (or specifically the end face 12a) in FIG. 2.

FIG. 3 shows a schematic view of such section, but in FIG. 3, the internal electrode layers 18 led out to the external electrode 14 on the end face 12b side are not visible. Also on the inner side of the section shown in FIG. 3, the laminate 20 constituted by the dielectric layers 17 and internal electrode layers 18 is surrounded by a pair of opposing cover layers 22 and a pair of opposing side margins 24. The cross sectional area of this laminate 20 roughly corresponds to or can be considered as area A as mentioned above. Under embodiments of the present invention, A is obtained as a product of W and L which are defined below.

W represents the length (the width) of an internal electrode 32 present at the center of the multiple internal electrode layers 18 in the laminate 20 (if there are an even number n of internal electrode layers visible on the aforementioned section, either the n/2th layer or (n/2+1)th layer may be selected) as the center internal electrode 32.

L represents the length (the height), along a perpendicular bisector 34 of this internal electrode 32, from the top face of the topmost internal electrode layer 18 to the bottom face of the bottommost internal electrode layer 18 in FIG. 3.

Next, area B, which represents the area of the aforementioned section excluding the external electrodes 14 as described above, is specifically the area, on the aforementioned section, of the element body 16 constituted by the laminate 20, pair of cover layers 22 and pair of side margins 24. This area can be obtained by, for example, capturing an optical microgram or scanning electron microgram of a multilayer ceramic capacitor corresponding to FIG. 3 and then image-analyzing the microgram using the specified software.

Under the present invention, the ratio of area A and area B, or A/B, as defined above, is 0.75 or more. In general, the internal electrode layer 18 has better adhesion with the external electrode 14 than the dielectric layer 17 and, by setting the ratio this way, the internal electrode layer 18 contacts the external electrode 14 over a larger area and the adhesion between the external electrode 14 and element body 16 increases as a result.

For this reason, the multilayer ceramic capacitor 10 conforming to the present invention, while adopting the L-shaped two-face electrode configuration of large capacitance as described above, also ensures sufficient adhesion between the external electrode 14 and element body 16 and can therefore achieve high reliability. From this point of view, preferably the aforementioned ratio A/B is 0.78 or more.

Also, given the finding of the studies conducted by the inventors of the present invention that increasing the A/B ratio excessively causes the reliability in the high-temperature load test to drop, preferably the A/B ratio is controlled to 0.92 or less so as to ensure such reliability as well.

Also, preferably the thickness of the internal electrode layer 18 is set greater than the thickness of the dielectric layer 17 in order to increase the adhesion between the external electrode 14 and element body 16. This is because such configuration allows for ensuring that the internal electrode layer 18 contacts the external electrode 14 over sufficient area.

From a similar viewpoint, preferably the thickness of the dielectric layer 17 is 0.2 to 0.8 µm. By reducing the thickness of the dielectric layer 17, the internal electrode layer 18 contacts the external electrode 14 over a larger area. Also, such configuration allows for an increase in the number of internal electrode layers 18 as the dielectric layers 17 become thinner, which is preferable from the viewpoint of capacitance increase of the multilayer ceramic capacitor 10.

Also, preferably the thickness of the external electrode 14 formed on one principle face 12 is 1 to 30 µm from the viewpoint of increasing the number of internal electrode layers 18 and thereby increasing the capacitance of the multilayer ceramic capacitor 10. The thickness of the external electrode 14 is the maximum value of the length T from the point of intersection with the principle face 12d to the end of the external electrode 14 along a normal line 36 (there are multiple normal lines) of the principle face 12d passing the external electrode 14 in FIG. 2. FIG. 2 does not show a clear starting point of the principle face 12d, but in such a case the principle face 12d is considered to start from where the curved part of the end face 12a ends.

In addition, although the thickness of the cover layer 22, thickness of the side margin 24, and thickness of the internal electrode layer 18 are not limited in any way with the multilayer ceramic capacitor 10 conforming to the present invention, the thickness of the cover layer 22 is normally 4 to 50 µm, the thickness of the side margin 24 is normally 4 to 50 µm, and the thickness of the internal electrode layer 18 is normally 0.26 to 1.00 µm.

Manufacturing Method of Multilayer Ceramic Capacitor

Next, the manufacturing method of the multilayer ceramic capacitor conforming to the present invention as described above is explained.

First, material powder for forming the dielectric layer is prepared. For the material powder, $BaTiO_3$, $CaTiO_3$, $SrTiO_3$, $CaZrO_3$, and various other powders that can be used to form ceramic sintered compact can be used.

These powders can be synthesized by causing various metal materials to react together. Various synthesizing methods are known, such as the solid phase method, sol-gel method, and hydrothermal method, among others. Under the present invention, any of these methods can be adopted.

To the obtained material powder, compounds that constitute secondary constituents can be added by specified amounts according to the purposes. Secondary constituents include oxides of rare earths such as Nd, Sm, Eu, Gd, Tb, Dy, Ho, and Er, as well as oxides of Mg, Mn, Ni, Co, Fe, Cr, Cu, Al, Mo, W, V, and Si.

The material powder obtained as above can be pulverized to adjust the grain size, or pulverized and then classified to regulate the grain size, as necessary, for example.

Then, binder such as polyvinyl butyral (PVB) resin, organic solvent such as ethanol or toluene, and plasticizer such as dioctyl phthalate (DOP) are added to the material powder and the ingredients are wet-mixed. The obtained slurry is applied on a base material in strips using the die-coater method or doctor blade method, for example, after which the slurry is dried to obtain a dielectric green sheet of 1.2 µm or less in thickness. Then, on the surface of the obtained dielectric green sheet, a metal conductive paste containing organic binder is printed by means of screen printing or gravure printing to arrange patterns of internal electrode layers to be led out alternately to the pair of external electrodes each having a different polarity. For the aforementioned metal, nickel is widely adopted from the viewpoint of cost.

Thereafter, the dielectric green sheet on which internal electrode layer patterns have been printed is stamped out to specified sizes and the stamped-out dielectric green sheets are stacked together by a specified number (such as 100 to 1,000 layers) so that when the base material is separated, the internal electrode layers and dielectric layers are staggered and also the edges of the internal electrode layers are exposed on both end faces of the dielectric layers in the length direction and led out alternately to the pair of external electrodes each having a different polarity. Cover sheets that will become the cover layers are pressure-bonded on top and bottom of the stacked dielectric green sheets and the bonded sheets/covers are cut to specified chip dimensions (such as 1.2 mm×0.7 mm×0.7 mm).

Here, for the method to form side margins, any of the various methods that are known can be adopted without any limitation at all; when cutting to the specified chip dimensions, for example, instead of cutting exactly at the positions of the internal electrode layers, cut to chips slightly wider than the internal electrode layers so that parts of the dielectric layer not covering the internal electrode layer are also included because, this way, a side margin of desired thickness can be formed on both side faces of the laminate to obtain an element body precursor that will become the element body 16 after sintering.

Figure 4A:
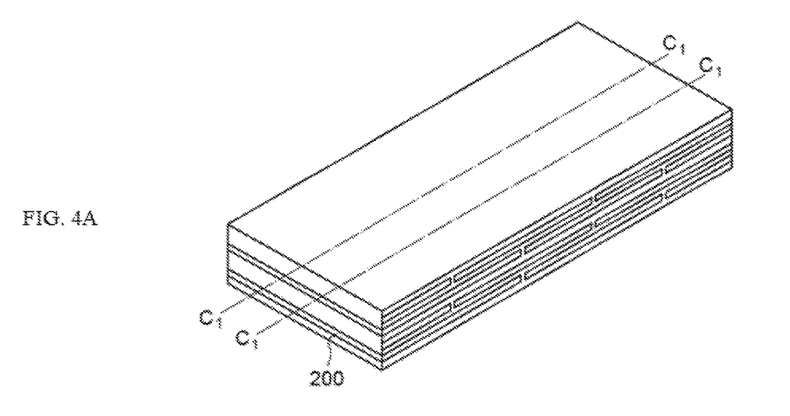
FIGS. 4A, 4B, and 4C show schematic views showing one example of how side margins are formed.

Furthermore, a different method can be used to form side margins as follows. To be specific, as shown in FIG. 4A, take multiple dielectric green sheets on which internal electrode patterns 200 have been printed in stripes at a specified interval (this interval corresponds to twice the distance between the external electrode 14 and the edge of the internal electrode layer 18 led out to the external electrode 14 on the opposite side of the aforementioned external electrode 14 in FIG. 2), and stack the dielectric green sheets so that the center of the stripe is superimposed with the interval part between the internal electrode patterns 200.

Figure 4B:
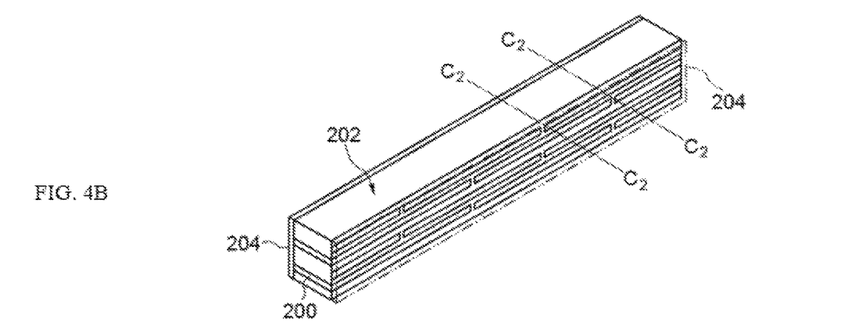

Cut this along line $C_1$-$C_1$ so that the striped internal electrode patterns 200 are cut across, to obtain a bar-like laminate 202 not having a pair of opposing side margins 204 as shown in FIG. 4B. Here, the cutting width (distance between the sections produced by cutting) corresponds to the size of the multilayer ceramic capacitor to be manufactured, or specifically to the distance between the pair of side faces 12e, f of the element body 16.

Figure 4C:
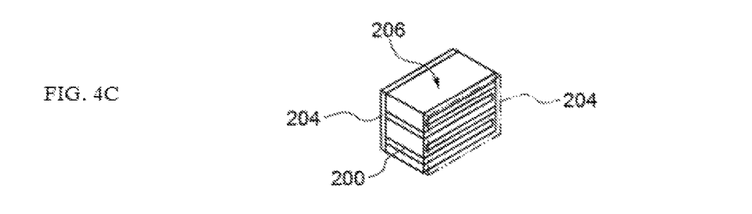

Side margins 204 are formed on the side faces of the obtained bar-like laminate 202 (normally side margins are formed using a material similar to that of the dielectric layers 17), which is then cut along line $C_2$-$C_2$ into individual chip sizes (line $C_2$-$C_2$ passes through the center of an internal electrode pattern 200 or center of the interval between internal electrode patterns 200), to obtain individual laminate chips 206 (FIG. 4C). On this chip 206, the internal electrodes are led out alternately on the sections produced by the aforementioned cutting and this chip 206 represents an element body precursor that will become the element body 16 after sintering.

Figure 5:
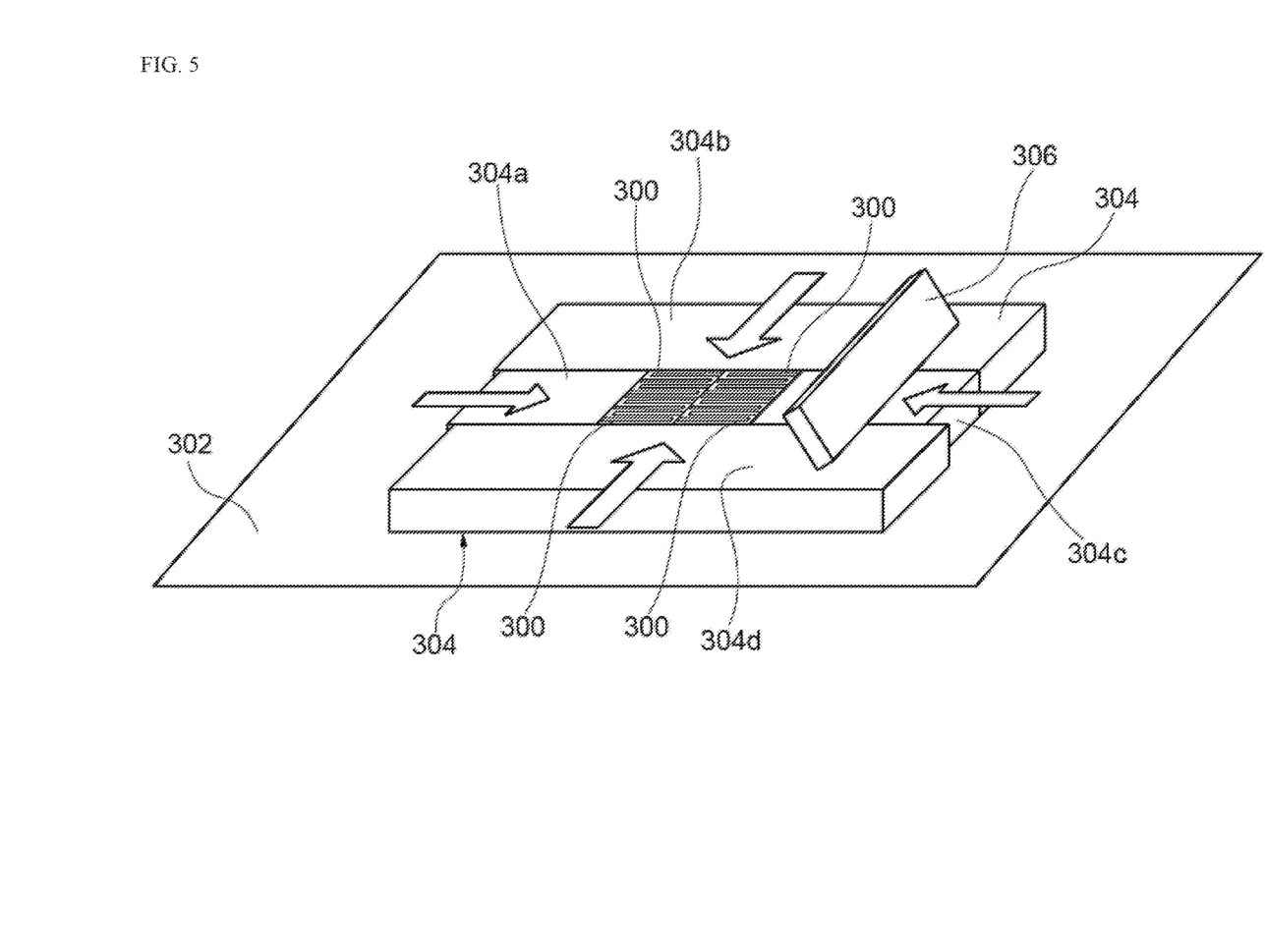
FIG. 5 is a schematic view showing one example of how side margins are formed.

Also, a different method can be used to form side margins as follows. To be specific, as shown in FIG. 5, the laminate of dielectric green sheets is cut exactly at the positions of the internal electrode layers or slightly inside, and the obtained laminate chips 300 (the internal electrode layers are exposed on their side face) are arranged on a group stage 302 so that their side faces face up. Then, on the group stage 302, multiple block materials 304a to 304d that can slide in the directions of the arrows as shown in the figure are caused to slide on the group stage 302 in the directions of the arrows. This way, an aggregate of rectangular planar shape constituted by multiple laminate chips 300 adhering together is obtained.

Then, in this condition, a squeegee 306 is used to apply a ceramic paste (normally material similar to the one used to form the dielectric layers 17) to form a ceramic paste layer of specified thickness on the top face of the aggregate and then the paste is dried. This thickness can be adjusted by adjusting the difference between the height of the arranged laminate chips 300 and the height of the block materials 304.

Since the ceramic paste layer is formed over the entire surface of the aggregate of laminate chips 300, a roller may be run over the top face of the aggregate under pressure or a blade may be pressed against positions corresponding to the boundaries of the laminate chips 300, to divide the ceramic paste layer to cover individual laminate chips 300.

This way, a side margin of specified thickness is formed on one side face of the laminate chip 300, and by flipping the chip and repeating the same operation as described above, a side margin can be formed on the other side face in a similar manner and an element body precursor that will become the element body 16 after sintering can be obtained.

An element body precursor is formed as explained above and, to achieve the A/B ratio specified under the present invention, all that is needed is to reduce the thickness of the cover layer and side margin and thereby adjust the A/B ratio within the specified range. Also, adhesion between the external electrode 14 and element body 16 can be increased by manufacturing the multilayer ceramic capacitor 10 with reduced dielectric layer thickness and increased internal electrode layer thickness in the aforementioned dielectric green sheet.

In addition, the corners of the element body precursor may be chamfered after the cover layers and side margins have been formed, to shape the element body precursor in such a way that the connection part of each side of the element body precursor is curved. This way, chipping of the corners of the element body precursor can be suppressed.

To achieve this shape, all that is needed is, for example, to place water, multiple element body precursors, and polishing medium, into a sealed rotary pot made of polyethylene or other material and rotate this sealed rotary pot to chamfer the corners of the element body precursors.

The element body precursors obtained as above, constituted by the laminate of dielectric layers and internal electrode layers, cover layers covering the top and bottom principle faces of the laminate, and side margins covering both side faces of the laminate, are put in an $N_2$ ambience of 250 to 500° C. to remove the binder, and then sintered for 1 minute to 2 hours in a reducing ambience of 1100 to 1300° C., to sinter and densify each compound constituting the aforementioned dielectric green sheet. This way, the element body 16 of the multilayer ceramic capacitor conforming to the present invention 10 is obtained.

Under the present invention, re-oxidizing treatment can also be given at 600 to 1000° C.

Then, external electrodes 14 are formed on both end faces and one principle face of the obtained element body 16. To form external electrodes at such specific positions, the method below may be adopted, for example.

The element bodies 16 are arranged so that one principle face contacts a printing table, and an external electrode paste constituted by Cu or other metal grains, ethyl cellulose or other organic binder, dispersant, and solvent is applied to another principle face by means of printing, which is then dried to form external electrodes on the principle face. Thereafter, both end faces of the element body 16 are dip-coated with a similar paste, followed by drying and baking. Thereafter, Ni and Sn plating films are formed.

The formation of external electrodes 14 on the principle face can also be implemented by using, when forming the cover layers, cover sheets whose surface has been pre-printed with external electrode patterns.

Also, external electrodes 14 can be formed by means of sputtering or deposition on either the principle face or end face.

This way, external electrodes 14 are formed on the pair of end faces and one principle face of the element body 16, and a multilayer ceramic capacitor 10 conforming to the present invention, whose A/B is in the specified range, is manufactured.

EXAMPLES

The present invention is explained in greater detail below using examples. It should be noted, however, that the present invention is not limited to these examples in any way.

Manufacturing of Multilayer Ceramic Capacitor

To 100 mol of barium titanate of 0.1 μm in average grain size, Dy and Mg were each added by 1.0 mol, and V and Mn were each added by 0.5 mol, into which organic solvent whose primary constituent is alcohol, polyvinyl butyral resin, dispersant, and plasticizer were mixed and dispersed to produce a coating slurry. Then, this slurry was coated on a base material using a die-coater to produce a dielectric green sheet. The amount of slurry supplied to the die-coater was adjusted to control the thickness of sheet.

Next, the aforementioned dielectric green sheet was screen-printed with a conductive paste prepared by mixing and dispersing Ni powder of 200 nm in average grain size, organic solvent whose primary constituent is alcohol, ethyl cellulose resin, dispersant, and plasticizer, to produce a dielectric green sheet printed with internal electrodes. The concentration of solid matter in the conductive paste was adjusted by the amount of paste solvent, to control the thickness of the internal electrode.

Multiple layers of dielectric green sheets (for forming the cover layers) and multiple layers of dielectric green sheets printed with internal electrodes were stacked together and then pressure-bonded and cut to produce individual unsintered laminates. The number of dielectric green sheet layers was changed to change the thickness of the cover layers.

To 100 mol of barium titanate of 0.1 μm in average grain size, the unsintered laminates were arranged so that their side margin face (side face) faced up, while Dy and Mg were each added by 1.0 mol, and V and Mn were each added by 0.5 mol, into which organic solvent whose primary constituent is alcohol, ethyl cellulose resin, dispersant, and plasticizer were mixed and dispersed to produce a ceramic paste. Then, this ceramic paste was applied to the top faces of the arranged unsintered laminates and then dried, to form side margins. The application thickness of the paste was adjusted to control the thickness of side margin. The opposing side margin face was also treated in a similar manner, and an element body precursor was obtained as a result.

Water, multiple element body precursors, and polishing medium were put in a sealed rotary pot and this sealed rotary pot was rotated to chamfer the corners of the element body precursors.

The element body precursors thus obtained, each constituted by the laminate of dielectric layers and internal electrode layers, cover layers covering the top and bottom principle faces of the laminate, and side margins covering both side faces of the laminate, were put in an $N_2$ ambience of 250 to 500° C. to remove the binder, and then sintered for 1 minute to 2 hours in a reducing ambience of 1100 to 1300° C.

The obtained element bodies were arranged so that one principle face contacted a printing table and an external electrode paste constituted by Cu grains, ethyl cellulose, dispersant, and solvent was applied to another principle face by means of printing and then dried to form external electrodes on the principle face, Thereafter, both end faces of the element body were dip-coated with a similar paste and then dried and baked. Thereafter, Ni and Sn plating films were formed.

Multilayer ceramic capacitors of the constitution shown below were manufactured as described above:

| | |
|---|---|
| Chip dimensions (L × W × H) | 1.2 mm × 0.7 mm × 0.7 mm |
| Thickness of dielectric layer | 0.16 to 0.90 μm |
| Number of dielectric layers | 427 to 506 layers |
| Thickness of internal electrode layer | 0.26 to 1.00 μm |
| Number of internal electrode layers | 427 to 506 layers |
| Thickness of cover layer | 4 to 50 μm |
| Thickness of side margin | 4 to 50 μm |
| Thickness of external electrode (including plating) (Cu:Ni:Sn = 14 to 24 μm:2 μm:4 μm) | Total 20 to 30 μm |
| Area A | As shown in Table 1 below. |
| Area B | As shown in Table 1 below. |

The thickness of the dielectric layer and that of the internal electrode layer were measured as follows. To be specific, the multilayer ceramic capacitor, from one end face to the other end face, was equally divided into four to prepare three cross sections in parallel with the end faces, and thickness was measured for 20 randomly-selected dielectric layers and 20 randomly-selected internal electrode layers in each of the sections, after which the results were averaged to obtain the representative thickness of the dielectric layer and that of the internal electrode layer.

Also, the section for obtaining area A and area B was produced as follows. To be specific, the multilayer ceramic capacitors in the Examples and Comparative Examples were mirror-polished from one end face, until the external electrodes formed on the end face were removed, the internal electrodes led out to the end face became visible, and the internal electrodes led out to the end face on the opposite side were not visible. Area A and area B were obtained on an observation image (optical microgram) of the section (mirror face) thus obtained at an enlargement magnification of 200 times The obtained multilayer ceramic capacitors in the Examples and Comparative Examples were each evaluated for various items as described below.

Adhesion Measurement

Adhesive tape (CT-24 manufactured by Nichiban) with a sticking force of 10 N per 25 mm was pressed with a force of 10 N or more against the external electrodes formed on the end faces of the multilayer ceramic capacitors in the Examples and Comparative Examples, and then peeled. For each of the Examples and Comparative Examples 100 capacitors were measured, and an NG (not good) judgment was given if two or more capacitors had their external electrode separated from the element body.

High-temperature Load Test

The high-temperature load test (105° C.—9 V) was conducted on the multilayer ceramic capacitors in the Examples and Comparative Examples. For each of the Examples and Comparative Examples 1,000 multilayer ceramic capacitors were tested, and the number of capacitors exhibiting abnormal withstand voltage after 1,000 hours was counted. 1,000 capacitors were measured, and an NG (not good) judgment was given if two or more capacitors exhibited abnormal withstand voltage.

The results of the above evaluations are shown in Table 1 below.

TABLE 1

| Example number | Area A [mm²] | Area B [mm²] | A/B | Thickness of internal electrode layer [μm] | Thickness of dielectric layer [μm] | Thickness of external electrode [μm] | Adhesion measurement (Number of separated capacitors) | High-temperature load test (Number of capacitors exhibiting abnormal withstand voltage) |
|---|---|---|---|---|---|---|---|---|
| Example 1 | 0.400 | 0.424 | 0.943 | 0.60 | 0.56 | 20.0 | OK (0) | NG (3) |
| Example 2 | 0.390 | 0.424 | 0.920 | 0.60 | 0.56 | 20.0 | OK (0) | OK (0) |
| Example 3 | 0.361 | 0.424 | 0.851 | 0.60 | 0.56 | 20.0 | OK (0) | OK (0) |
| Example 4 | 0.332 | 0.424 | 0.783 | 0.26 | 0.90 | 20.0 | OK (0) | OK (0) |

TABLE 1-continued

| Example number | Area A [mm²] | Area B [mm²] | A/B | Thickness of internal electrode layer [μm] | Thickness of dielectric layer [μm] | Thickness of external electrode [μm] | Adhesion measurement (Number of separated capacitors) | High-temperature load test (Number of capacitors exhibiting abnormal withstand voltage) |
|---|---|---|---|---|---|---|---|---|
| Example 5 | 0.318 | 0.424 | 0.750 | 0.60 | 0.56 | 20.0 | OK (0) | OK (0) |
| Example 6 | 0.318 | 0.424 | 0.750 | 0.26 | 0.90 | 20.0 | OK (1) | OK (0) |
| Example 7 | 0.318 | 0.424 | 0.750 | 0.86 | 0.80 | 20.0 | OK (0) | OK (0) |
| Example 8 | 0.318 | 0.424 | 0.750 | 0.96 | 0.20 | 20.0 | OK (0) | OK (1) |
| Example 9 | 0.318 | 0.424 | 0.750 | 1.00 | 0.16 | 20.0 | OK (0) | NG (4) |
| Example 10 | 0.318 | 0.424 | 0.750 | 0.60 | 0.56 | 30.0 | OK (1) | OK (0) |
| Comparative Example 1 | 0.303 | 0.424 | 0.715 | 0.60 | 0.56 | 20.0 | NG (3) | OK (0) |
| Comparative Example 2 | 0.292 | 0.424 | 0.689 | 0.60 | 0.56 | 20.0 | NG (5) | OK (0) |

In Comparative Examples 1 and 2 whose A/B ratio was less than 0.75, the internal electrode did not contact the external electrode over sufficient area and the adhesion between the external electrode and element body was insufficient. Such low adhesion can cause the reliability of the multilayer ceramic capacitor to drop.

Also, in Example 1 whose A/B ratio was extremely high at 0.943, abnormal withstand voltage occurred in the high-temperature load test. This, and the result of Example 2, together suggest that an excessively high A/B ratio would lead to insufficient reliability under high-temperature load conditions and that an A/B ratio of 0.92 or less would be preferred. The abnormal withstand voltage in Example 9 was likely caused by the extreme thinness of its dielectric layer.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer ceramic capacitor having an element body of roughly rectangular solid shape which is constituted by dielectric layers of a same material alternately stacked with internal electrode layers having different polarities and which has a pair of principle faces, a pair of end faces, and a pair of side faces, wherein:
    external electrodes are formed on the pair of end faces and one principle face of the element body, thereby each constituting an L-shaped two-face electrode; and
    on a cross section taken in parallel with one end face of the multilayer ceramic capacitor in a manner passing through a midpoint between the one end face and ends of the internal electrode layers near the one end face where the internal electrode layers connected to the external electrode on the other end face side do not extend, a ratio of area A, which is constituted by cross sectional areas of the internal electrode layers connected to the external electrode on the one end face side and cross sectional areas of the dielectric layers present between the internal electrode layers, and area B, which is an entire cross sectional area of the element body excluding the external electrodes, A/B, is 0.92 or more but 0.943 or less,
    wherein the internal electrode layer has a substantially uniform thickness, and the dielectric layer has a substantially uniform thickness, and
    the thickness of the internal electrode layer is in a range of 0.6 to 1.0 μm, and the thickness of the dielectric layer is in a range of 0.2 to 0.8 μm.

2. The multilayer ceramic capacitor according to claim 1, wherein a thickness of the external electrode formed on the one principle face is 1 to 30 μm.

3. The multilayer ceramic capacitor according to claim 1, wherein the thickness of the internal electrode layer is greater than the thickness of the dielectric layer.

* * * * *